(12) United States Patent
Bansal et al.

(10) Patent No.: US 11,531,741 B2
(45) Date of Patent: Dec. 20, 2022

(54) DYNAMIC PASSWORD GENERATION

(71) Applicant: Bank of America Corporation, Charlotte, NC (US)

(72) Inventors: Gaurav Bansal, Hyderabad (IN); Shekhar Singh Mehra, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 132 days.

(21) Appl. No.: 17/140,005

(22) Filed: Jan. 1, 2021

(65) Prior Publication Data

US 2022/0215087 A1 Jul. 7, 2022

(51) Int. Cl.
*G06F 21/32* (2013.01)
*G06F 21/46* (2013.01)
*H04L 69/22* (2022.01)
*G06F 3/04883* (2022.01)
*H04L 9/40* (2022.01)

(52) U.S. Cl.
CPC .......... *G06F 21/32* (2013.01); *G06F 3/04883* (2013.01); *G06F 21/46* (2013.01); *H04L 63/0846* (2013.01); *H04L 69/22* (2013.01)

(58) Field of Classification Search
None
See application file for complete search history.

(56) References Cited

U.S. PATENT DOCUMENTS

| 9,213,819 B2* | 12/2015 | Grigg | G06F 3/0488 |
| 9,357,391 B1* | 5/2016 | Alsvig | G06F 21/36 |
| 9,633,638 B2* | 4/2017 | Lim | G10H 1/18 |
| 9,779,225 B2* | 10/2017 | Mason | G06F 21/31 |
| 9,886,570 B2* | 2/2018 | Bell | G06F 21/36 |
| 11,138,297 B2* | 10/2021 | Vargas | G06F 21/31 |
| 2004/0054929 A1* | 3/2004 | Serpa | G06F 21/31 726/5 |
| 2011/0260829 A1* | 10/2011 | Lee | G06F 21/31 345/173 |
| 2013/0086666 A1* | 4/2013 | Cheng | G06F 21/32 726/5 |
| 2013/0326604 A1* | 12/2013 | Hird | G06F 21/36 726/7 |
| 2014/0143859 A1* | 5/2014 | Linge | G06F 21/36 726/19 |
| 2014/0310764 A1* | 10/2014 | Tippett | G06F 21/31 726/1 |

(Continued)

*Primary Examiner* — James R Turchen
(74) *Attorney, Agent, or Firm* — Weiss & Arons LLP

(57) ABSTRACT

Systems, methods and apparatus are provided for altering a static password between entry and authentication using a dynamic logic. A client application may receive entry of a user password and record an amount of pressure associated with the entry. The client application may dynamically select a virtual contact surface material and generate audio files corresponding to writing or typing the password characters on the selected surface material with the recorded amount of pressure. The client application may compress the audio files by embedding them within the same digital space according to a time-based logic. The dynamic password files may be routed to a central server. Data packet fragmentation may further improve security during transmission. The central server may reconstruct the password for authentication using the time-based logic.

20 Claims, 5 Drawing Sheets

(56) References Cited

U.S. PATENT DOCUMENTS

| | | | | |
|---|---|---|---|---|
| 2015/0294096 A1* | 10/2015 | Grigg | ............... | H04L 63/08 |
| | | | | 726/5 |
| 2017/0228531 A1* | 8/2017 | Raji | ............... | H04L 63/10 |
| 2018/0032716 A1* | 2/2018 | McClintock | ............... | G06F 21/64 |
| 2018/0349592 A1* | 12/2018 | Tao | ............... | G06F 3/0488 |
| 2019/0213306 A1* | 7/2019 | Caselles | ............... | G06F 21/32 |

* cited by examiner

DYNAMIC PASSWORD GENERATION

FIELD OF TECHNOLOGY

Aspects of the disclosure relate to dynamic alteration of a password prior to authorization.

BACKGROUND OF THE DISCLOSURE

Conventional passwords are static which leaves them susceptible to attack by a malicious actor. Static passwords may be captured by malware on a client machine or compromised while in storage on a central server. Frequent password changes provide some measure of protection, but such changes are burdensome to a user tasked with memorizing each new password.

It would be desirable to provide a client application that converts a static password into a dynamic password prior to authentication without requiring any additional user input. It would also be desirable to implement additional dynamic software-based and hardware-based security measures to protect the password during the authentication process.

SUMMARY OF THE DISCLOSURE

Systems, methods, and apparatus for dynamic password generation are provided.

A client application may record an amount of pressure associated with entry of a user password. The client application may dynamically select a virtual contact surface. The client application may generate a virtual friction sound simulating entry of user password characters on the selected contact surface with the recorded amount of pressure. The client application may generate separate audio files for each password character.

The client application may compress the generated audio files by layering them within the same digital file space according to a time-based logic. Audio files corresponding to individual password characters or groups of password characters may be embedded together. The client application may share the time-based logic with a central server.

The compressed dynamic password file may be prepared for packet fragmentation. The client application may generate a split byte and use the split byte to join two data packets. During transmission, a stimulus such as a signal boost may cause the split byte to split, dynamically shifting the composition of the data packets during transmission. The split may be coordinated by a network router.

A central server may receive the compressed dynamic password file and reassemble the data packets. The server may reconstruct the password using the time-based logic and authenticate the password.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
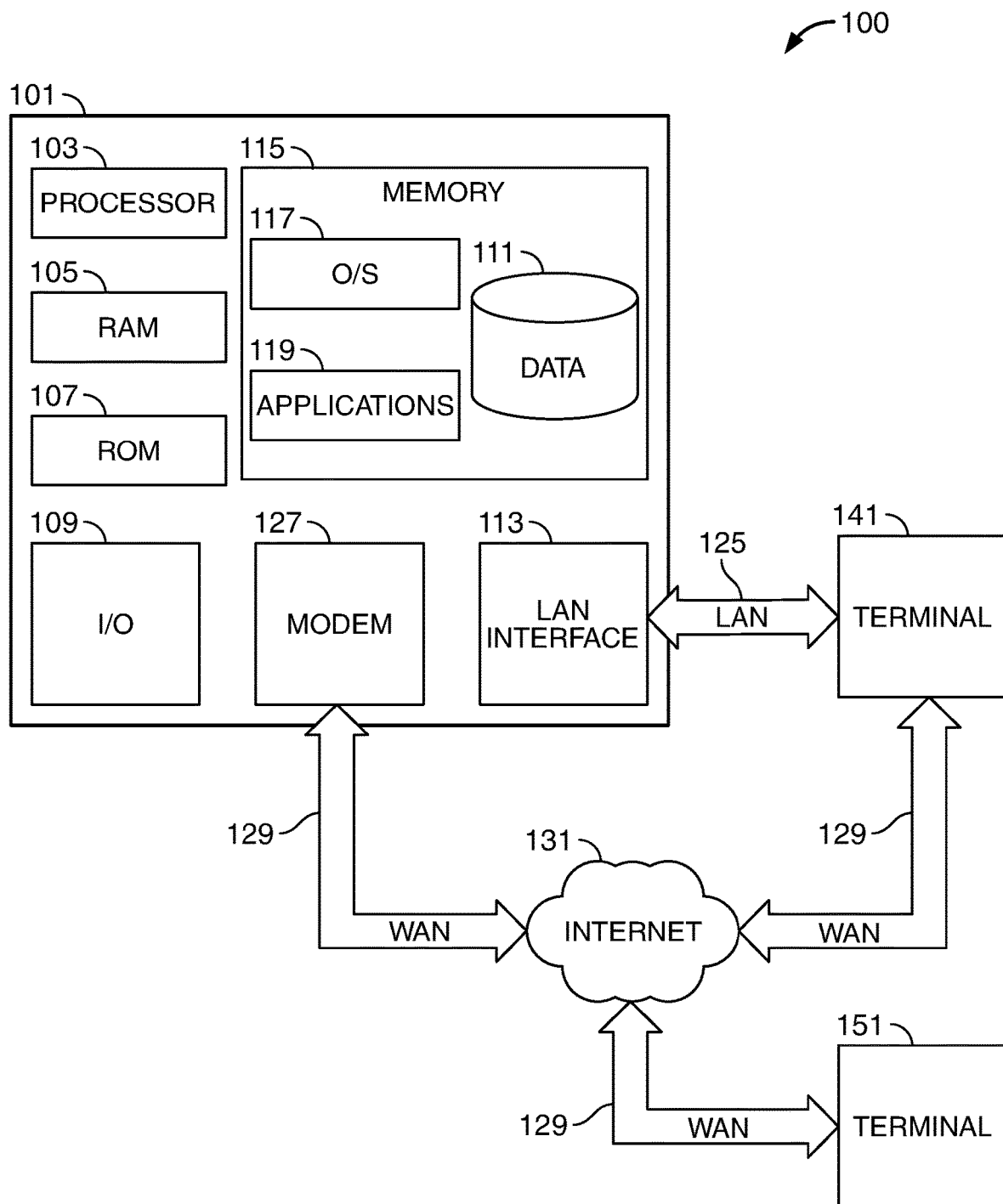
FIG. 1 shows illustrative apparatus in accordance with principles of the disclosure.

Systems, methods and apparatus for dynamic password generation are provided. A client application may dynamically alter a static password at the time of entry to generate a dynamic password. The client application may implement additional dynamic protections to further alter the password structure for transmission to a central server for authentication. The central server may use time-based logic to reconstruct the original password for authentication.

For the sake of illustration, the invention will be described as being performed by a "system." The system may include one or more features of the apparatus and methods that are described herein and/or any other suitable device or approach.

The system may include client server architecture. The system may include a client machine running a client application. The client application may include a user interface. The user interface may be configured to accept entry of a user password.

The password entered by the user may be a static password. The static password may be changed at predetermined intervals. The static password may be changed at random intervals. The static password may be selected by the user. The static password may be generated by a password generator and assigned to the user.

The user may enter the static password by drawing on a touch-sensitive screen. The user may draw with a finger, a stylus or using any suitable tool or method. In some embodiments, the password may be entered using a mechanical or virtual keyboard or keypad.

The client application may be in communication with one or more biometric sensors. A biometric sensor may capture unique biometric markers associated with the user prior to or during entry of the password. For example, a biometric sensor may measure user pressure on a touch-sensitive screen or a mechanical keyboard during entry of the password. Illustrative physical biometric markers include fingerprint, facial recognition, palm print, hand geometry, and iris recognition. Illustrative behavioral biometric markers include typing rhythm, gait, keystroke, signature, and voice. The biometric markers may confirm the identity of the user entering the password.

The client application may record a biometric marker received from the biometric sensor. The client application may use the biometric marker to confirm the identity of the user before, during or after password entry. The client application may further use the biometric marker to generate a dynamic password from the static password.

The client application may use dynamic logic to generate one or more digital files associated with the dynamic password. The dynamic password files may store digital audio content.

The client application may select a virtual contact surface to be associated with the password entry. The client application may capture an entered password and a measure of user pressure associated with password entry. By combining aspects of the virtual contact surface with the amount of pressure during entry, the client application may generate a digital audio file. The digital audio file may correspond to a simulated friction sound of writing or typing the password characters on the selected surface with the measured amount of pressure. In some embodiments, the client application may generate separate audio files for each character of the password. In some embodiments, the client application may generate separate audio files for sets of password characters. Digital dynamic password files may be stored in any suitable format.

A new virtual contact or surface may be substituted by the client server at predetermined intervals. For example, the contact surface may be changed weekly, daily, or multiple times per day. In some embodiments, the new virtual contact surface may be substituted at randomized intervals. In some embodiments, the client application may substitute a new contact surface each time the user enters a password.

Selection of a virtual contact surface may be dependent on dynamic logic. The dynamic logic may be time-based logic. Time-based logic may tie computer processes to particular clock or calendar functions.

The transformation of a static password following entry using dynamic logic improves security without requiring any changes on the part of the user. Even if a malicious actor were to gain access to the static password during storage or entry, he would not be able to replicate the dynamic password.

The dynamic password file may be transmitted to a central server for authentication. The client application may apply additional security measures to protect the dynamic password file during transmission. The client application may split the password into sections. Each password section may include a predetermined number of characters. In some embodiments, the sections may include a random number of characters. The number of password sections and the arrangement of characters within each section may be determined using time-based logic.

The client application may generate separate audio files for each character of the password. Within each password section, the separate audio files for each character may be layered on top of each other and embedded within the same storage space. In some embodiments, the audio files for the password characters may be layered in an order that is different from the order in which the characters were entered. In some embodiments, the password may not be split into sections and all of the characters from the password may be embedded within the same space. The layering and embedding may compress the size of the password to a single byte or to any suitable size.

The client application may use time-based logic to determine the layering and embedding of the password characters or password sections. The compressed password cannot easily be reconstructed without this key to the encryption.

The client application may transmit the compressed password in the company of a predetermined number of false or "dummy" passwords. The dummy passwords may be generated by the client application and may include dynamic transformations of incorrect static passwords. The dummy passwords may be altered using the same dynamic logic as the password entered by the user. The inclusion of incorrect passwords may further protect against attack as a malicious actor will not be able to identify the true password.

Transmission of a dynamic password file may involve transmission of multiple data packets containing the password data. Packet splitting may be used to conceal the password by masking the true number and arrangement of the data packets.

The client application may initially join data packets using split bytes. The split bytes may be generated by the client application. The split bytes may be junk bytes created using any suitable combination of binary digits. The combination may be determined by time-based logic. The combined data packets may mask the true structure of the transmission.

In some embodiments, the data packets may be joined out of sequence to further deter attackers. Each individual data packet in the array may retain the destination header data.

The system may include one or more routers. The routers may be connected on a local area network (LAN). Data packets associated with the dynamic password file may be split within the LAN before reaching the final router or gateway. Splitting the packets at this stage protects the data before it reaches a point more vulnerable to attack.

The packets may be split using physical stimuli that weaken the split bytes. Splitting the packets using a physical stimulus instead of software instructions also makes the process more difficult for a malicious actor to penetrate.

The packets may be split at split points in the network. Split points may include routers, switches, or other connections in the LAN. The split points may be coordinated by a local router or gateway. The split points may include specialized network hardware. The split points may include attenuators, antennae, signal boosters, light sources or any other suitable hardware.

In some embodiments, packet splitting may be initiated by a change in signal strength. The strength of the signal may be modified for a predetermined amount of time. For example, a nanosecond long interruption or adjustment in the signal could trigger the split.

The splitting may be initiated by a signal boost. The signal booster may be associated with a router on the LAN. The client application may share the combination of digits used to generate the split byte with one or more routers on the network. The signal may break up the split byte joining the data packets, causing the packets to separate.

In a fiber optic network, packet splitting may be initiated by particular wavelengths of light. A split point may absorb light at a wavelength associated with the split byte, neutralizing the energy of the split byte and causing the packets to separate. In some embodiments, a portion of the fiber optic cable may be modified to absorb light at a predetermined wavelength.

Additional packet splitting may occur after the data has reached the gateway and been routed to the central sever over a wide area network (WAN).

The system may include a central server. The server may be in communication with more than one client machine, each running the client application. The server may communicate with the client application regarding the time-based logic used to generate and compress the password. The client application and the server may communicate using any suitable method. The client application and the server may communicate on a predetermined schedule.

The server may receive the dynamic password. The server may reorder the data packets using header information or any other suitable information. The server may apply time-based logic as a key to reconstruct the password for authentication. The key may function as a map to identify memory locations for each layer of password data.

The server may authenticate the reconstructed password. If the password is determined to be valid, the system may grant access to the user. If the password is not valid, the system may deny access to the user. Access information may be displayed to the user on the user interface of a client machine.

One or more non-transitory computer-readable media storing computer-executable instructions are provided. When executed by a processor on a computer system, the instructions perform a method for altering a password using dynamic logic between entry and authentication.

The method may include recording an amount of pressure associated with entry of a user password and biometrically confirming an identity of a user based, at least in part, on the recorded amount of pressure.

The method may include dynamically selecting a virtual contact surface. The method may include generating a first digital file for a first virtual friction sound associated with entering a first set of password characters on the selected contact surface with the recorded amount of pressure. The media may include generating a second digital file for a second virtual friction sound associated with entering a second set of password characters on the selected contact surface with the recorded amount of pressure.

The method may include generating a compressed digital file by layering the first digital file over the second digital file according to a time-based logic. The method may include layering any suitable number of digital files each associated with one or more password characters.

The method may include transmitting the compressed digital file to a central server for password authentication. The method may include decompressing the digital files at the central server using the time-based logic and authenticating the password.

Systems, methods, and apparatus in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 is a block diagram that illustrates a computing device 101 (alternatively referred to herein as a "server or computer") that may be used in accordance with the principles of the invention. The computer server 101 may have a processor 103 for controlling overall operation of the server and its associated components, including RAM 105, ROM 107, input/output ('I/O") module 109, and memory 115.

I/O module 109 may include a microphone, keypad, touchscreen and/or stylus through which a user of device 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions.

For example, memory 115 may store software used by server 101, such as an operating system 117, application programs 119, and an associated database Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks.

When used in a LAN networking environment, computer 101 is connected to LAN 125 through a network interface or adapter 113.

When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Additionally, application program 119, which may be used by server 101, may include computer executable instructions for invoking user functionality related to communication, such as email, short message service (SMS), authentication services and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that encrypt information, process received executable instructions, interact with enterprise systems, perform power management routines or other suitable tasks. Algorithms may be used to perform the functions of one or more of the audio file generation, password compression, password decompression, split byte generation, packet joining and packet fragmentation, and/or perform any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
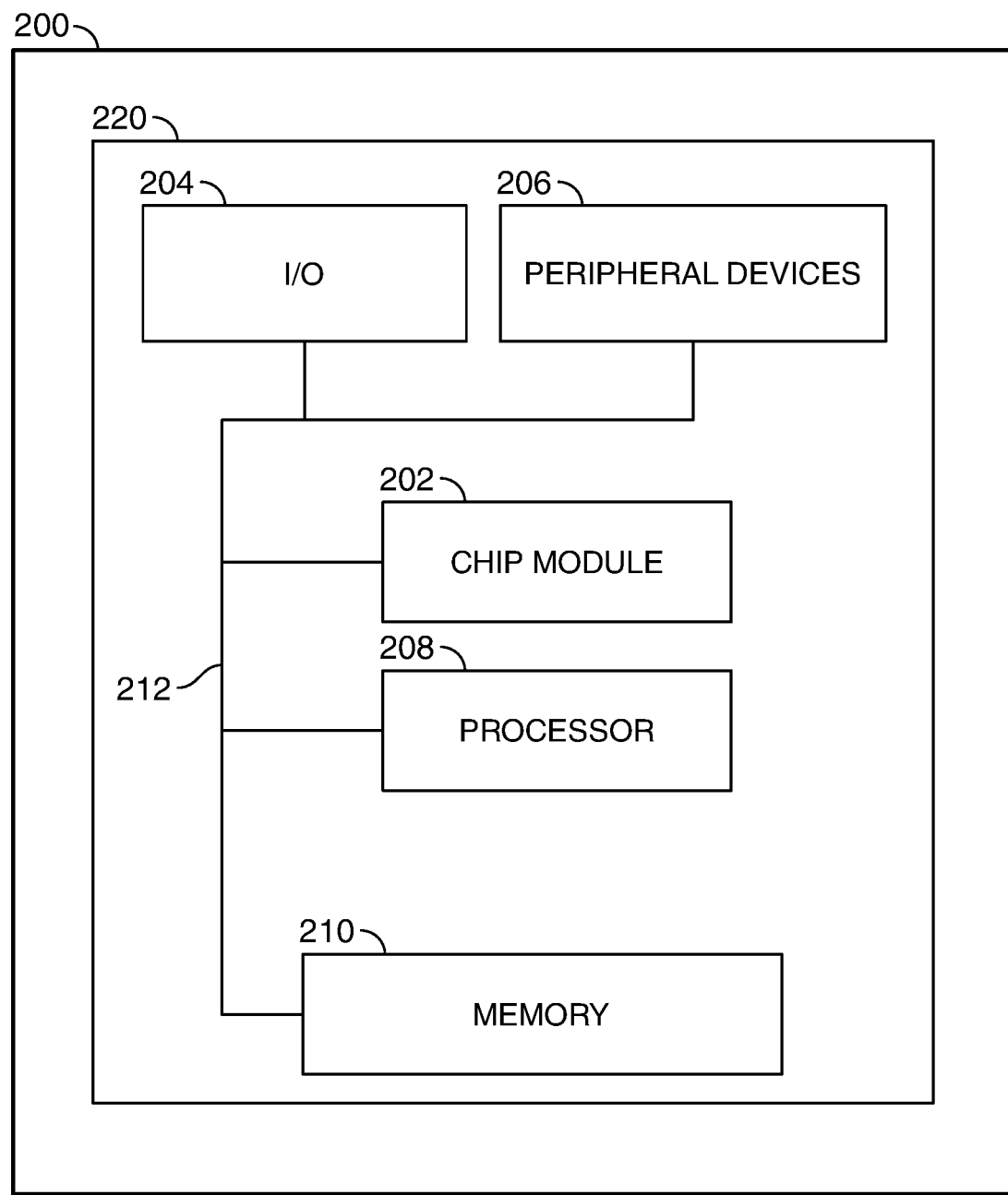
FIG. 2 shows illustrative apparatus in accordance with principles of the disclosure.

FIG. 2 shows an illustrative apparatus 200 that may be configured in accordance with the principles of the invention.

Apparatus 200 may be a computing machine. Apparatus 200 may include one or more features of the apparatus that is shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may compute imminence, permanence, edge weights, mapping, and perform other methods described herein; and machine-readable memory 210.

Machine-readable memory 210 may be configured to store in machine-readable data structures: user information, biometric information, password information, dynamic password parameters, audio file information, time-based logic parameters and any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
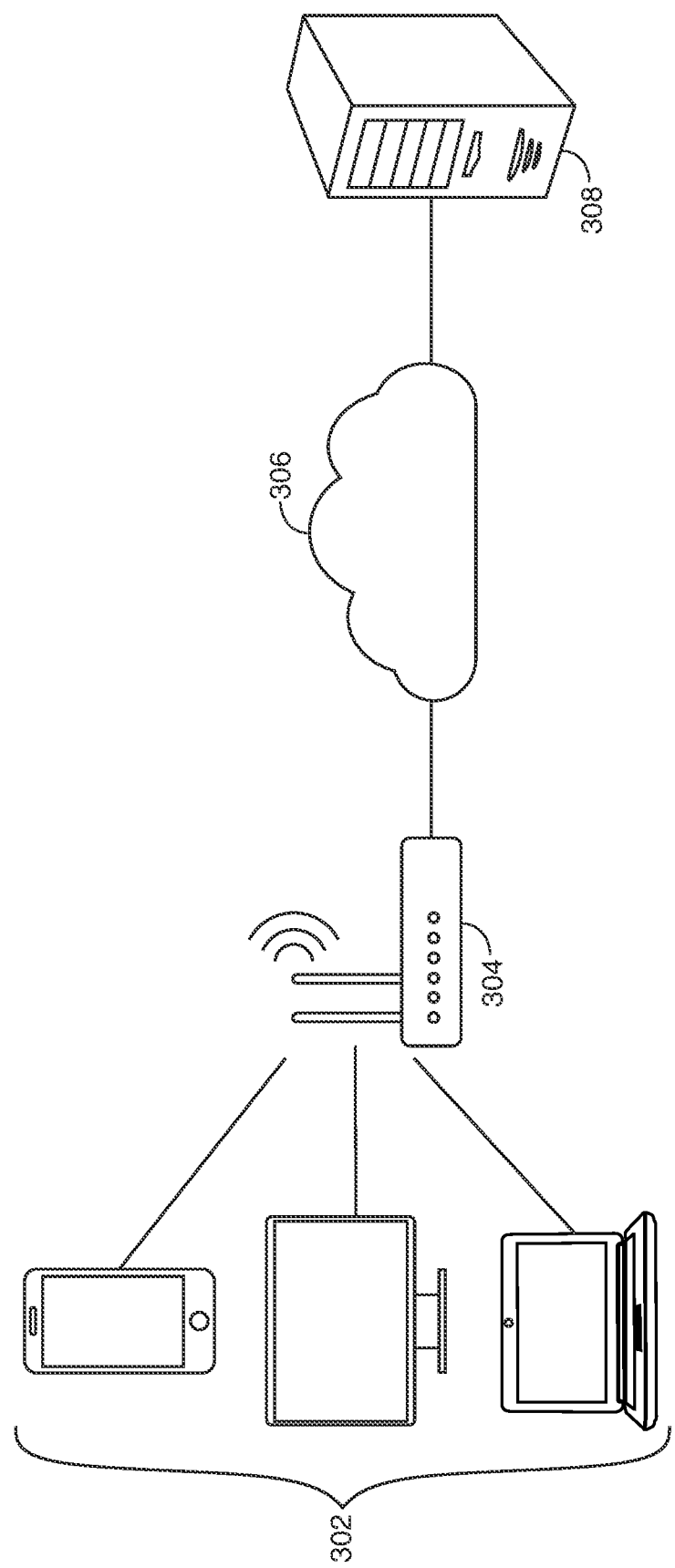
FIG. 3 shows illustrative architecture in accordance with principles of the disclosure.

FIG. 3 shows illustrative architecture 300. Architecture 300 may include one or more elements shown in FIGS. 1 and 2. Architecture 300 may be a client server architecture. Client devices 302 may include a laptop, computer terminal, mobile device or any other suitable client device. A user may enter a password at a client device. A client application running on the client device may alter the password using dynamic logic to generate a dynamic password.

The dynamic password file may be transmitted to router 304. Router 304 may be part of a network of routers in a LAN. In some embodiments, router 304 may generate a modified signal that triggers packet fragmentation by disrupting split bytes joining the packets. Router 304 may function as a gateway between the LAN and a WAN.

Router 304 may access internet 306 and route the password to server 308. Server 308 may be a central server. In some embodiments, server 308 may be cloud-based. Server 308 may be configured to authenticate the password. Router 304 may also route time-based logic information from the client application to the central server.

Figure 4:
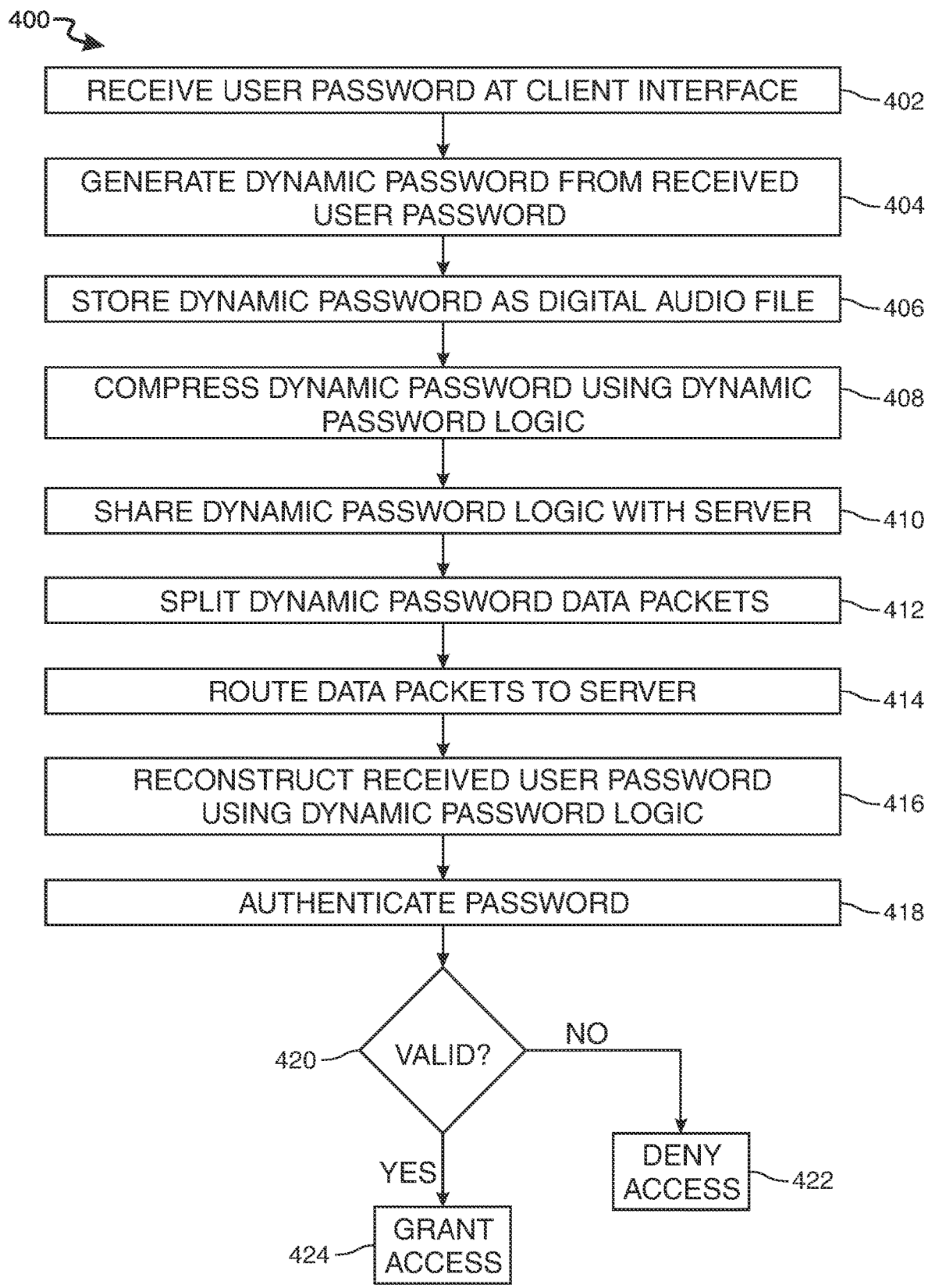
FIG. 4 shows an illustrative process flow in accordance with principles of the disclosure.

FIG. 4 shows illustrative process flow 400 for generating and authenticating a dynamic password. Steps 402-408 may be associated with a client application. At step 402, the client application receives entry of a user password at a user interface of the client device. At step 404 the client application generates a dynamic password from the received user password. At step 406, the client application stores a dynamically altered password as one or more digital audio files.

At step 408 the client application compresses digital audio files associated with the dynamic password according to a time-based logic. At step 410, the client application shares the time-based logic with a server. In some embodiments, the client application may push the time-based logic to the server. In some embodiments, the client application may share the time-based logic in response to a request from the server.

Steps 412-414 may be associated with transmission of the dynamic password. At step 412, the dynamic password data packets are split by stimulating the split bytes. The packets may split in response to a modified signal from a router. The packets may split in response a light emission at a predetermined wavelength. At step 414, the data packets are routed to the server.

Steps 416-422 may be associated with a central server. At step 416, the server reconstructs the original password using the time-based dynamic password logic. At the step 418, the server authenticates the password. At step 420, the server may determine whether the password is valid. At step 422, if the password is not valid, user access is denied. At step 424, if the password is valid, user access is granted.

Figure 5:
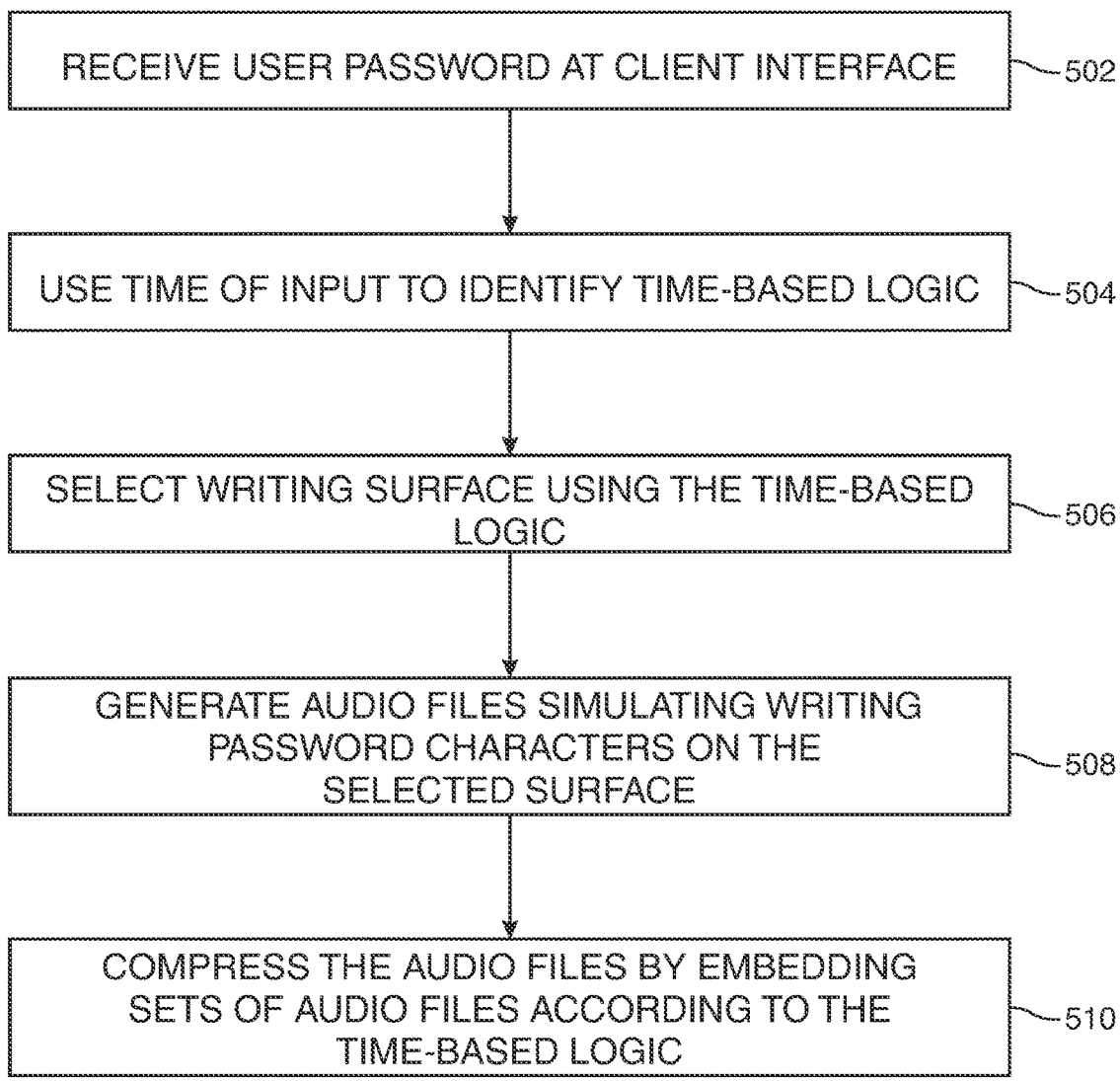
FIG. 5 shows an illustrative process flow in accordance with principles of the disclosure.

FIG. 5 shows process flow 500 for generating a dynamic password. One or more elements of process flow 500 may overlap with elements of process flow 400, shown in FIG. 4.

At step 502 a client application receives a user password at an interactive user interface. In some embodiments, the user may write the password at on a touch-sensitive screen. At step 504, based on the time of password entry, the client application identifies time-based logic that will be applied to generate the dynamic password.

At step 506 the client application selects a writing surface material according to the time-based logic. At step 508 the client application generates an audio file by simulating the sound of writing the password on the selected surface material. At step 510, the client application compresses the audio files by embedding sets of audio files within the same storage space. The files may be arranged according to the time-based logic, which maps the locations of the files.

Thus, methods and apparatus for DYNAMIC PASSWORD GENERATION are provided. Persons skilled in the art will appreciate that the present invention can be practiced by other than the described embodiments, which are presented for purposes of illustration rather than of limitation, and that the present invention is limited only by the claims that follow.

What is claimed is:

1. A system for dynamic alteration of a password following input, the system comprising:
   a first processor configured to:
      record an amount of pressure applied by a user during input of a user password;
      biometrically confirm an identity of the user based, at least in part, on the recorded amount of pressure;
      dynamically select a virtual contact surface material;
      generate a first dynamic password file comprising a first simulated friction sound corresponding to input of a first set of user password characters on the selected contact surface material with the recorded amount of pressure;

generate a second dynamic password file comprising a second simulated friction sound corresponding to input of a second set of user password characters on the selected contact surface material with the recorded amount of pressure; and generate a compressed dynamic password file, the compressing comprising layering the first dynamic password file over the second dynamic password file according to a time-based logic;

a router configured to route the compressed dynamic password file to a second processor; and a second processor configured to:
apply the time-based logic to decompress the compressed dynamic password file;
apply the time-based logic to identify the user entered password; and
authenticate the password.

2. The system of claim 1 wherein input of the user password comprises writing the password on a touch-sensitive screen.

3. The system of claim 1 wherein:
the first processor is further configured to generate a predetermined number of compressed dynamic password files each associated with an incorrect password and transmit the predetermined number of compressed dynamic password files associated with the incorrect passwords along with a compressed digital file associated with a user-entered password; and
the second processor is configured to accept the predetermined number of incorrect passwords along with a correct password.

4. The system of claim 1 wherein:
the compressed dynamic password file comprises a plurality of data packets, each data packet comprising a destination address for the second processor; and
the first processor is configured to generate a split byte and to join two data packets using the split byte.

5. The system of claim 4 wherein:
the data packets joined by the split byte are not in sequence; and
the second processor is configured to re-assemble the data packets joined by the split byte in a correct sequence.

6. The system of claim 4 wherein:
the router is configured to transmit a signal boost at a predetermined frequency; and
in response to the signal boost, the split byte is configured to disconnect from the data packets, the disconnecting causing the joined data packets to separate.

7. The system of claim 4 wherein the split byte is configured to disconnect from the data packets in response to a predetermined frequency of light, the disconnecting causing the joined data packets to separate.

8. One or more non-transitory computer-readable media storing computer-executable instructions which, when executed by a processor on a computer system, perform a method for altering a password using dynamic logic between entry and authentication, the method comprising:
recording an amount of pressure associated with entry of a user password;
biometrically confirming an identity of a user based, at least in part, on the recorded amount of pressure;
dynamically selecting a virtual contact surface;
generating a first digital file comprising a first simulated friction sound associated with entering a first set of one or more password characters on the selected contact surface with the recorded amount of pressure;
generating a second digital file comprising a second simulated friction sound associated with entering a second set of one or more password characters on the selected contact surface with the recorded amount of pressure;
generating a compressed digital file, the compression comprising layering the first digital file over the second digital file according to a time-based logic;
transmitting the compressed digital file to a central server for password authentication;
decompressing the digital files at the central server using the time-based logic; and
authenticating the password.

9. The media of claim 8 further comprising:
generating a predetermined number of compressed digital files each associated with an incorrect password; and
transmitting the predetermined number of compressed digital files associated with the incorrect passwords along with the compressed digital file for the password entered by the user;
wherein authenticating the password comprises accepting the predetermined number of incorrect passwords along with the password entered by the user.

10. The media of claim 8 wherein the compressed digital file comprises a plurality of data packets, each data packet comprising the destination address for the central server, the method further comprising generating a split byte and use the split byte to join two data packets.

11. The media of claim 10 wherein:
the data packets joined by the split byte are not in sequence; and
the method further comprises reassembling the data packets joined by the split byte in the correct sequence prior to authentication.

12. The media of claim 10 wherein the split byte is configured to disconnect from the data packets in response to a signal boost at a predetermined frequency, the disconnecting causing the joined data packets to separate.

13. The media of claim 10 wherein the split byte is configured to disconnect from the data packets in response to a predetermined frequency of light, the disconnecting causing the joined data packets to separate.

14. A method for dynamic alteration of password characters between entry and authentication, the method comprising:
at a first processor:
recording an amount of pressure associated with entry of a user password;
biometrically confirming an identity of a user based, at least in part, on the recorded amount of pressure;
dynamically selecting a virtual contact surface;
generating a first digital file comprising a first simulated friction sound associated with entering a first set of one or more password characters on the selected contact surface with the recorded amount of pressure;
generating a second digital file comprising a second simulated friction sound associated with entering a second set of one or more password characters on the selected contact surface with the recorded amount of pressure;
generating a compressed digital file, the compressing comprising layering the first digital file over the second digital file according to a time-based logic; and
transmitting the compressed digital file to a second processor for password authentication; and at a second processor:
- receiving the compressed digital file;
- decompressing the digital files using the time-based logic; and
- authenticating the password.

15. The method of claim 14 wherein the first set of password characters and the second set of password characters were entered by the user in a first order, the method further comprising layering the digital file associated with the first set of password characters and the digital file associated with the second set of password characters in a second order, the second order being different from the first order.

16. The method of claim 14 further comprising:
- generating a predetermined number of compressed digital files each associated with an incorrect password; and
- transmitting the predetermined number of compressed digital files for authentication along with a compressed digital file for the user password;
- wherein authenticating the password comprises accepting the predetermined number of incorrect passwords in addition to the correct password.

17. The method of claim 14 wherein:
- the digital file comprises a plurality of data packets, each data packet comprising the destination address; and
- the first processor is configured to generate a split byte and use the split byte to join two data packets.

18. The method of claim 17 wherein:
- the data packets joined by the split byte are not in sequence; and
- the second processor is configured to re-assemble the data packets in the correct sequence.

19. The method of claim 17 wherein the split byte is configured to disconnect from the data packets in response to a signal boost at a predetermined frequency, the disconnecting causing the joined data packets to separate.

20. The method of claim 17 wherein the split byte is configured to disconnect from the data packets in response to a predetermined frequency of light, the disconnecting causing the joined data packets to separate.

* * * * *